Patented Aug. 19, 1930

1,773,217

UNITED STATES PATENT OFFICE

GEORGE C. CARHART, OF SYRACUSE, NEW YORK, ASSIGNOR TO THE BROWN-LIPE GEAR COMPANY, OF SYRACUSE, NEW YORK, A CORPORATION OF NEW YORK

TRANSMISSION MECHANISM

Application filed March 11, 1924. Serial No. 698,499.

This invention relates to transmission mechanism, such as is used in motor vehicles and has for its object a particularly simple, compact and efficient means for relieving the gears or other shiftable elements from all driving force and shock during, and incident to, gear shifting operations and for relieving the gearing and other mechanisms of the vehicle from shocks and jars that would otherwise occur, during quick starting and starting with a heavy load, and from shocks and jars liable to occur during rapid acceleration of the power and during letting in or engaging of the main clutch, when the engine is running relatively slow or is stopped and the vehicle is coasting or running under its own momentum, and when any two driving and driven elements are rotating at different speeds when the main clutch is let in.

The invention consists in the novel features and in the combinations and constructions hereinafter set forth and claimed.

In describing this invention, reference is had to the accompanying drawings in which like characters designate corresponding parts in all the views.

Figure 1:
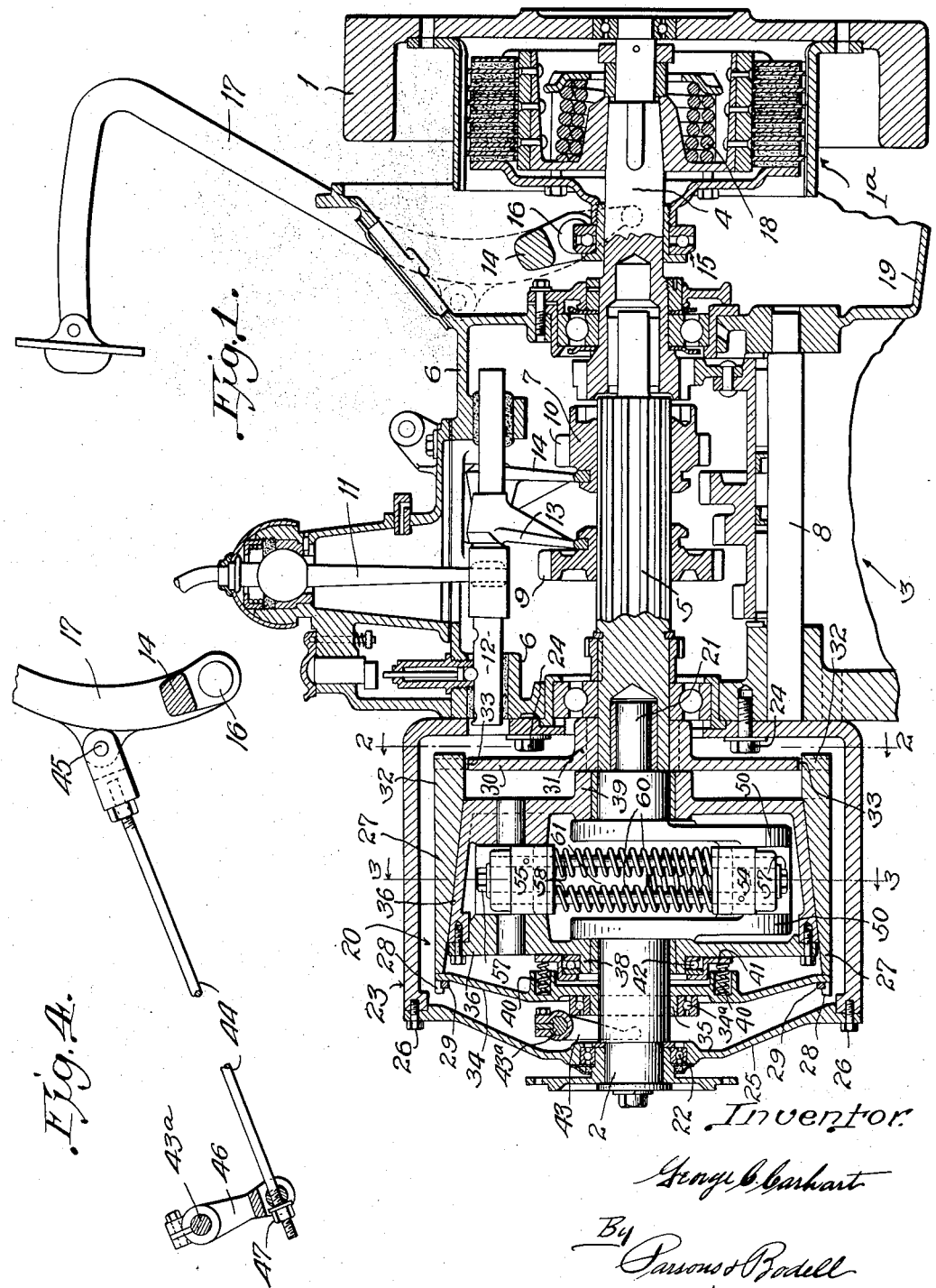

Figure 1 is a vertical sectional view, partly broken away, of a transmission mechanism embodying my invention.

Figure 2:
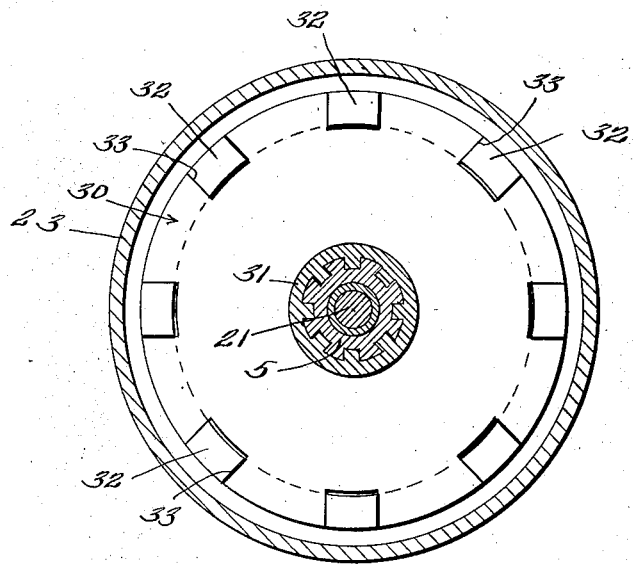
Figure 3:
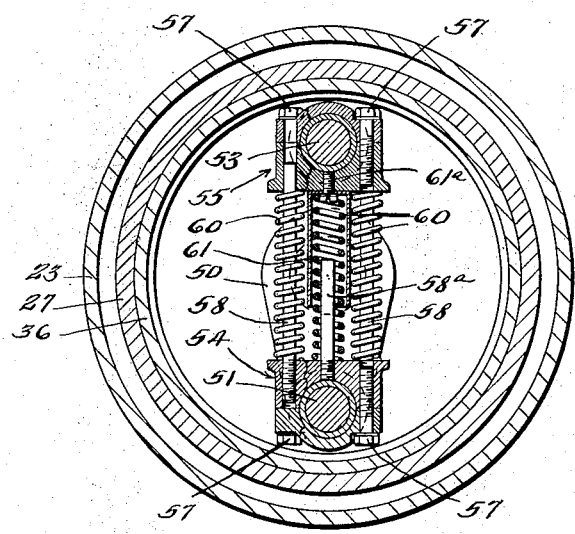

Figures 2 and 3 are sectional views taken, respectively, on lines 2—2 and 3—3 Fig. 1.

Figure 4 is a fragmentary detail view of the operating means for the clutches and connections between such means.

In motor vehicles, the transmission gearing, the differential gear, the propeller shaft and universal joints, the driving axle shafts and their connections with the driving wheels and the side gears of the differential gear, are subject to shocks and jars which tend to develop looseness, and the shiftable gears and clutches of the transmission gearing are also subjected to sudden jars and strains tending to break and loosen them, and also the gears clash during gear shifting operations unless skillfully performed, such clashing resulting in injury to the teeth. All of these evils are largely due to the quick connection of the transmission mechanism to the driver or engine or to the too sudden connection of the transmission mechanism to the driver or engine by letting in the main clutch when the engine is running relatively slow or is dead and the vehicle coasting or in motion, or to shifting of the gears or clutches while the gears, clutches, etc. to be engaged are being driven at different speeds, due to some of said gears or any two driving and driven parts to be connected, being driven from the driving axle through the propeller shaft when the vehicle is coasting or running under its momentum.

This power transmitting mechanism comprises generally a driver and a driven shaft, a change speed transmission gearing between the driver and the driven shaft including a driving shaft, a transmission shaft and change speed mechanism between the driving and transmission shafts, a main clutch connecting the driver and the driving shaft, a second clutch connecting the transmission and the driven shafts, a torque cushioning means interposed between the transmission shaft and the driven shaft, operating means for the clutches and a connection between the operating means for the main clutch and the operating means for the second clutch whereby, upon operation of the main clutch, the second clutch is also operated. That is, when the main clutch is thrown out, the second clutch is thrown out, and when the main clutch is thrown in, the second clutch is also thrown in. The torque cushioning device is preferably located between one of the sections of the second clutch and the shaft with which such section is associated. The sections of the second clutch and the operating means are constructed and arranged to synchronize the rotation of the shafts connected thereby during shifting of the change speed gears and clutches of the transmission gearing.

1 designates the driver which is here shown as the flywheel of the engine of the vehicle. 2 is the driven shaft having means for connection to the propeller shaft of the motor vehicle, the propeller shaft, as will be understood, being connected to the driving axles through a pinion, ring gear and a differential gearing. 3 designates the change speed transmission gearing as a whole, this including a driving shaft 4, a transmission shaft 5 journalled in suitable bearings in the casing 6, and change speed gears between these shafts including a shiftable high speed clutch section 7 for connecting the shafts 4 and 5 directly together and gears mounted on the shaft 5 and the countershaft 8, some of these gears, as the gears 9 and 10 on the transmission shaft being shiftable into and out of mesh with gears on the countershaft 8 to produce different speeds and reverse speed. The gear 10 is usually formed as a unit with the high speed clutch section 7. The shiftable gears 9 and 10 are shifted in any suitable manner as by a lever 11 selectively coacting with shifting rods 12 having forks 13, 14 coacting with the shiftable gears 9, 10 all of which wil be understood by those skilled in the art. The construction of the transmission gearing, per se, forms no part of this invention.

The shafts 4, 5 are usually arranged in axial alinement and also the driven shaft 2 is usually alined with the shafts 4, 5. 1ª designates the main clutch for connecting the driver or fly-wheel 1 and the driving shaft 4 of the transmission gearing, the main clutch being of any suitable form, size and construction, it being here shown as a friction clutch of the multiple disk type, although any other form of main clutch may be used.

The operating means for the main clutch includes a yoke 14 coacting with a throw out bearing 15 slidable on the shaft 4, this yoke being mounted upon a rock shaft 16 on which is also mounted a lever as a pedal 17. As will be readily understood, the clutch 1ª is held in or engaged, by a powerful spring 18 and is disengaged against the action of the spring by the depression of the pedal 17. The shaft 4 has a pilot bearing in the driver or flywheel 1 and the transmission gear casing 6 is provided with an extension 19 which houses the clutch, the extension being bolted to the engine casing around the flywheel 1 in the well known manner.

In the illustrated embodiment of this invention, the rear clutch 20 is of a friction type, it being shown as a cone clutch and its frictional engagement is sufficient to transmit the power without slipping under practically all conditions but to slip and synchronize the rotation of the shafts 2 and 5 when rotating at different speeds during gear changing operations.

The clutch 20, as here illustrated, comprises sections mounted respectively on the transmission shaft 5 and the driven shaft 2, the latter being shown as having a pilot bearing at 21 in the transmission shaft 5 and as being journalled in a bearing 22 provided in a casing 23 inclosing the rear clutch 20 and suitably secured to the transmission gear casing in any suitable manner as by screws 24.

The rear wall 25 of the casing 23 is preferably detachably secured to the casing, as by screws 26. One of the sections of the clutch 20 is shiftable into and out of engagement with the other and a torque equalizing device is interposed between one of the clutch sections and the shaft with which such clutch section is associated.

As here illustrated, the clutch section associated with the transmission shaft 5 is shiftable axially relatively to a clutch section associated with the driven shaft 2, and the clutch section associated with the transmission shaft 5 is connected to the shaft 5 to rotate therewith, while the section associated with the driven shaft is rotatable relatively to the driven shaft under abnormal conditions, owing to the torque cushioning device to be described.

The clutch section associated with the transmission shaft 5, as here shown, comprises an outer drum 27 which is shiftable axially and which is carried by a flange 30 having a hub 31 secured to the rear end of the transmission shaft 5 to rotate therewith, the drum being slidably interlocked with such flange 30 to rotate therewith and to slide axially thereof, it being here shown as having teeth 32 slidable in peripheral notches 33 in the flange 30. The drum 27 also has a plate or wall 34 at its rear end provided with a bearing 35 on the driven shaft 2. The wall 34 is detachably secured to the drum 27 and, as here illustrated, the drum is formed with slots or notches 28 in which are interlocked peripheral tongues on the wall 34 and the plate or wall is held with its tongues in the notches by a snap or lock ring 29.

36 designates the clutch section associated with the driven shaft 2, it being here shown as a hollow drum having a peripheral conical face coacting with a complemental conical face of the section 27, the drum 36 having spaced apart hubs or bearings 38, 39 on the driven shaft 2, the bearing 39 thrusting against the hub 31. The section 27 is thrust into engaging position by spring means as a plurality of springs 40 interposed between the plate 34 and a rotatable thrust ring 41 mounted on the hub 38 of the section 36, an anti-friction thrust bearing 42 being interposed between the ring 41 and the section 36.

The shiftable section 27 is operated to throw out the clutch against the pressure of the springs 40 by any suitable means, as a shifting fork 43 mounted on a rock shaft 43ª journalled in the case 23 and extending to the outside thereof, the fork being normally spaced apart from the hub or throw out bearing 34ª of the plate 34 to provide a lost motion connection which permits the main clutch to be partially thrown out in advance of the rear clutch and the rear clutch to be engaged in advance of the main clutch.

The connection between the operating means or the pedal 17 for the main clutch 1ᵃ and the operating means for the clutch section 27 comprises a link 44 connected at its front end at 45 to the pedal 17 and at its rear end to a rock arm 46 on the outer end of the shaft 43ᵃ. This link is adjusted by a nut 47 on the rear end of the link and thrusting against the arm 46.

The torque cushioning means, as here shown, is inclosed in the inner drum or clutch section 36 and is interposed between such drum 36 and the driven shaft 2. As here illustrated, the driven shaft 2 is formed with a double crank 50 within the clutch section 36, the crank arms being connected by an eccentric pin 51, the hubs 38 and 39 of the clutch section 36 being mounted on opposite sides of the double crank.

The clutch section 36 is also provided with an eccentric pin 53 normally arranged diametrically opposite the pin 51 and a yielding compressible means as a connecting rod element connects the pins 51 and 53.

This connecting rod element comprises heads 54 and 55 mounted on the pins 51 and 53 and springs interposed between the heads. Each head 54 and 55 is here shown as split transversely into two sections to form a split bearing in the pin 51 or 53 and the sections thereof are held together on the pins by screws 57.

Each head has one or more guide pins 58 fixed thereto and slidable in the other head and some of the springs 60 encircle such pins. Another of the springs is located substantially centrally of the blocks and is housed within a tubular housing 61 attached by a screw 61ᵃ to one head and extending part way toward the other, and encircles a short pin 58ᵃ extending from the latter head toward the former. The sleeve or housing 61 serves to limit the movement of the heads toward each other and hence prevent the springs 60 from undue compression.

When greater power is applied to the shafts 4 and 5 than can be immediately received by the shaft 2 as when the engine is accelerated too rapidly the rear clutch can rotate ahead of the driven shaft and during such rotation and in so doing the crank pin 53 will move in an arc relatively to the crank pin 51 out of a position diametrically opposite the crank pin 51 and during such relative movement, the springs 60 will be compressed; and as soon as the rotation of the shafts 5 and 2 is synchronized, the springs will return the pins 51 and 53 to their positions diametrically opposite each other. Also in the event, the shaft 2 is retarded from rotation as when the brakes are applied to the wheels of the vehicle, the same action takes place. Also when the shaft 2 is actuated faster than the shaft 5 as when coasting with the main clutch thrown out or with the engine dead and again letting in the main clutch or when shifting gears from high to second the same action takes place with the exception that the crank pin 51 rotates in an arc relatively to the crank pin 53 and compresses the springs.

In operation, upon the depression of the pedal 17, the main clutch 1ᵃ is first thrown out or partially thrown out until the lost motion is taken up between the rear shifter fork 43 and the throw out bearing 34ᵃ of the clutch section 27, then further movement disengages the section 27 from the inner section 36, so that the gears of the transmission are relieved of all driving force. The shifting of the gears can then be effected and the clutch 1ᵃ let in by relieving the foot pressure on the pedal 17, whereupon the rear clutch section 27 first engages before the main clutch is fully engaged, and slips and synchronizes the rotation of the shafts 2 and 5 in case the shafts are rotating at different speeds.

In the event the driver 1 is rotating at a different speed or transmitting more power than can be received by the gearing and the driven shaft 2 when the main clutch is engaged, the shock is absorbed or relieved by the yielding relative rotation in either direction of the shafts 5 and 2 permitted or effected by the springs 60 of the connecting rod element.

In the event of quick acceleration of the engine faster than the power can be received by driven shaft 2, all parts are relieved of shock by the fact that the clutch and shaft may have relative rotation in either direction against the compression of the spring 60 when the crank pins 51, 53 move out of their diametrically opposite position in either direction.

Also, in case the momentum of the vehicle is causing the propeller shaft to act as a driver and hence drive the driven shaft 2 faster than the transmission shaft 5, the crank pins 51, 53 of the torque equalizing device will move out of their opposite positions against the action of the spring 60 and relieve all parts of shock and jar.

What I claim is:

1. In a combined clutch and torque cushioning device for transmission mechanisms, the combination of alined shafts, supporting means having bearings for the shafts, one of the shafts being formed with a double crank including an eccentric pin and having a bearing in the other shaft, a clutch comprising a section mounted on the shaft formed with the crank and having hubs on said shaft on opposite sides of the crank and formed with an eccentric pin opposite to the eccentric pin of the crank, a yielding connecting rod element between said eccentric pins, and the other clutch section being mounted on the other shaft, and means for effecting relative movement of the sections into and out of engagement with each other.

2. In a combined clutch and torque cushioning device, the combination of alined shafts, an annular flange on one of the shafts, inner and outer drums having coacting clutch faces, the outer drum being interlocked with said flange on one of the shafts and slidable axially relatively to the inner drum and the inner drum being mounted on the other shaft, and a torque cushioning device within the inner drum, said torque cushioning device being connected to the inner drum and to the shaft on which the inner drum is mounted, means for normally holding the drums in engaged position and means operating to shift the outer drum relatively to the inner drum.

In testimony whereof, I have hereunto signed my name at Syracuse, in the county of Onondaga, and State of New York, this 10th day of March, 1924.

GEORGE C. CARHART.